(12) United States Patent
Bugeja (10) Patent No.: US 7,997,107 B2
(45) Date of Patent: Aug. 16, 2011

(54) IGNITION KEY SWITCH MECHANISM

(75) Inventor: Brian Bugeja, Crewe (GB)

(73) Assignee: Bentley Motors Limited (GB)

( * ) Notice: Subject to any disclaimer, the term of this patent is extended or adjusted under 35 U.S.C. 154(b) by 764 days.

(21) Appl. No.: 11/664,074

(22) PCT Filed: Sep. 27, 2005

(86) PCT No.: PCT/GB2005/003716
§ 371 (c)(1),
(2), (4) Date: Apr. 16, 2008

(87) PCT Pub. No.: WO2006/035219
PCT Pub. Date: Apr. 6, 2006

(65) Prior Publication Data
US 2008/0250828 A1    Oct. 16, 2008

(30) Foreign Application Priority Data

Sep. 28, 2004  (GB) .................................. 0421487.0
Aug. 12, 2005  (GB) .................................. 0516528.7

(51) Int. Cl.
*B60R 25/02* (2006.01)
(52) U.S. Cl. ........................ 70/252; 70/245; 70/247
(58) Field of Classification Search .............. 70/245, 70/247, 248, 251, 252, 255
See application file for complete search history.

(56) References Cited

U.S. PATENT DOCUMENTS

| 3,559,755 | A | * | 2/1971 | Pond ............................. 180/287 |
| 3,763,956 | A | * | 10/1973 | Ruff ............................. 180/283 |
| 4,837,567 | A | * | 6/1989 | Kleefeldt et al. ............ 340/5.72 |
| 4,945,740 | A | | 8/1990 | Kawano et al. |
| 4,955,935 | A | * | 9/1990 | Katayama .................. 74/473.21 |
| 5,179,868 | A | * | 1/1993 | Thibeault ..................... 74/411.5 |
| 5,255,547 | A | * | 10/1993 | Burr et al. ....................... 70/252 |
| 5,562,568 | A | | 10/1996 | Smale |
| 6,354,120 | B1 | * | 3/2002 | Tan et al. ........................ 70/252 |
| 2003/0115917 | A1 | | 6/2003 | Rudolph et al. |

FOREIGN PATENT DOCUMENTS

| DE | 42 06 251 | 9/1992 |
| DE | 101 01 983 | 7/2002 |

* cited by examiner

*Primary Examiner* — Suzanne Barrett
(74) *Attorney, Agent, or Firm* — Salter & Michaelson

(57) ABSTRACT

An ignition key switch mechanism for a vehicle having an automatic or semi-automatic gearbox comprises two solenoids and arranged at right angles to each other between which a slider or lever is disposed. The mechanism locks to prevent turning of the ignition key to the off position and removal of the key. Locking is effected by activating one solenoid to pull the shaft of that solenoid inside the armature of the solenoid. That in turn pulls the slider towards the solenoid and enables a locking pin on the slider to lock the mechanism. As the slider moves toward the solenoid a notch in the slider is brought into line with the shaft of the second solenoid. This shaft enters the notch under spring force to hold the mechanism in the locked position. Unlocking is effected by activating the second solenoid to withdraw the shaft from the notch allowing the first solenoid and the locking pin to return to unlocked positions which in turn permits the key to be turned to the off position and removed.

11 Claims, 8 Drawing Sheets

IGNITION KEY SWITCH MECHANISM

TECHNICAL FIELD

This invention relates to an ignition key switch mechanism for a vehicle.

BACKGROUND

The mechanism is intended for a vehicle having an automatic or semi automatic gearbox where the ability to remove a key inserted in the mechanism is governed by the position of the gear shifter of the gearbox. In addition, the ability to move the gear shifter from a given position, usually the park position, may depend upon the brake pedal being depressed. Systems already exist in which the ignition key switch mechanism, brake pedal and gear shifter are interlinked so that an inserted key may only be removed under certain conditions. One such known arrangement is described in U.S. Pat. No. 5,562,568. In this arrangement an interlock system is provided for a vehicle brake, gearbox gear shifter and ignition key switch. The interlock system comprises control means having two bi-stable solenoids one of which is operative to lock and unlock the gear shifter in park position and the other of which is operative to block and unblock ignition key movement to the off position for removal. It is an object of the invention to simplify such arrangements.

SUMMARY OF THE INVENTION

According to one aspect of the present invention, there is provided an ignition key switch mechanism for a vehicle comprising a lock barrel connected to an ignition switch, the lock barrel defining an ignition key aperture for an ignition key, and having an off position means preventing removal of an inserted key from the lock barrel in any position of the barrel other than the off position and means preventing turning of the barrel to the off position unless the gear shifter of the associated gearbox is in a park position, and solenoid means comprising first and second solenoids, and an intermediate member disposed between the solenoids, the intermediate member being disposed for movement between a first position in which turning of the ignition key in the ignition key aperture is prevented and a second position in which turning of the ignition key in the ignition key aperture to the off position is permitted to correspondingly prevent or permit removal of the ignition key from the ignition key aperture.

According to another aspect of the invention there is provided a control system for a vehicle having a gear shifter controlled automatic gearbox and an ignition key switch mechanism comprising a lock barrel connected to an ignition switch, the lock barrel defining an ignition key aperture for an ignition key, and having an off position, means preventing removal of an inserted key from the lock barrel in any position of the barrel other than the off position and means preventing turning of the barrel to the off position unless the gear shifter of the associated gearbox is in a park position and solenoid means comprising first and second solenoids, and an intermediate member disposed between the solenoids, the intermediate member being disposed for movement between a first position in which turning of the ignition key in the ignition key aperture is prevented and a second position in which turning of the ignition key in the ignition key aperture to the off position is permitted to correspondingly prevent or permit removal of the ignition key from the ignition key aperture.

According to a further aspect of the invention there is provided a vehicle having a control system having a gear shifter controlled automatic gearbox and an ignition key switch mechanism comprising a lock barrel connected to an ignition switch, the lock barrel defining an ignition key aperture for an ignition key, and having an off position means preventing removal of an inserted key from the lock barrel in any position of the barrel other than the off position and means preventing turning of the barrel to the off position unless the gear shifter of to associated gearbox is in a park position and solenoid means comprising first and second solenoids, and an intermediate member disposed between the solenoids, the intermediate member being disposed for movement between a first position in which turning of the ignition key aperture is prevented and a second position in which turning of the ignition key in the ignition key aperture to the off position is permitted to correspondingly prevent or permit removal of the ignition key from the ignition key aperture.

DESCRIPTION OF THE DRAWINGS

In order that the invention may be more clearly understood, one embodiment thereof will now be described, by way of example, with reference to the accompanying drawings in which:—

FIG. 1(1) to 1(6) respectively diagrammatically show various operational positions of an ignition key switch mechanism with the gear shifter of an associated automatic gearbox in a park position.

FIGS. 2(1) to 2(4) respectively diagrammatically show various operational positions of the ignition key switch mechanism of FIGS. 1(1) to 1(6) with the gear shifter of the associated automatic gearbox not in a park position.

FIG. 11 shows the embodiment of FIGS. 7 to 9 in a jammed locked position.

FIG. 12 is a front perspective view of an embodiment according to the invention in an unlocked condition.

FIG. 13 shows a partial view in plan of the embodiment of FIG. 12 in a locked condition.

FIG. 14 is a side perspective view of the embodiment of FIGS. 12 and 13. Referring generally to FIGS. 1(1) to 1(6) the ignition key switch mechanism comprises a lock barrel 1 defining a key aperture 2 into which an ignition key 3 (not shown in FIG. 1(1)) may be inserted and a bistable solenoid 4 having an armature 5. In the specification the term bi-stable also encompasses semi-bi-stable. In the latter, movement in one direction is achieved by a return spring in contrast to a "fully" bi-stable in which movement in both directions is achieved magnetically.

-DETAILED DESCRIPTION

A coupler is provided to mate the lock barrel 1 against the ignition switch, which in turn is assembled against a printed circuit board (PCB). These are all assembled on a plastic switchbox.

The bistable solenoid has two stable states, one in which the armature 5 adopts an unblocking action and the other in which the armature adopts a blocking action in relation to the barrel 1. The solenoid only consumes current in moving between states. It does not use current in either of the two states. Quiescent current is therefore reduced or eliminated.

The lock barrel 1 has four rotational positions with respect to the remainder of the mechanism, namely, off, accessories, ignition and crank. The solenoid works when the key is in accessories, ignition or crank. If one starts from engine off position, the gear selector can be moved from park, only when the key is at least in ignition position, but this is a gear selector control, wherein the gear selector is locked on park, until the key reaches ignition position.

The bi-stable solenoid can only work when the key has been turned to the accessories position and when the gear shifter of the automatic gearbox is moved from park. A microswitch is provided to sense the presence or absence of the key 3 in the aperture 2. When the lock is in the off position, the solenoid does not interfere with the barrel 1 of the lock so that the key may be inserted and rotated to any of the above positions. Only when the key is moved from the off position can the gear shifter be moved from the park position and only when the gear shifter subsequently is not in the park position does the solenoid inhibit the barrel returning to the off position. The presence of the key in the locked position is sensed by the microswitch, which in turn sends a signal to the solenoid. The micro-switch only senses whether the key is inside the ignition switch. It does not sense whether the key is locked or not. For the solenoid to work a signal from the microswitch and a signal from the gear shifter showing that it is not in park is required. The solenoid adopts an unblocking position when the gear shifter has been returned to park and the key can only be removed from the lock when the solenoid adopts an unblocking position.

Figure 11:
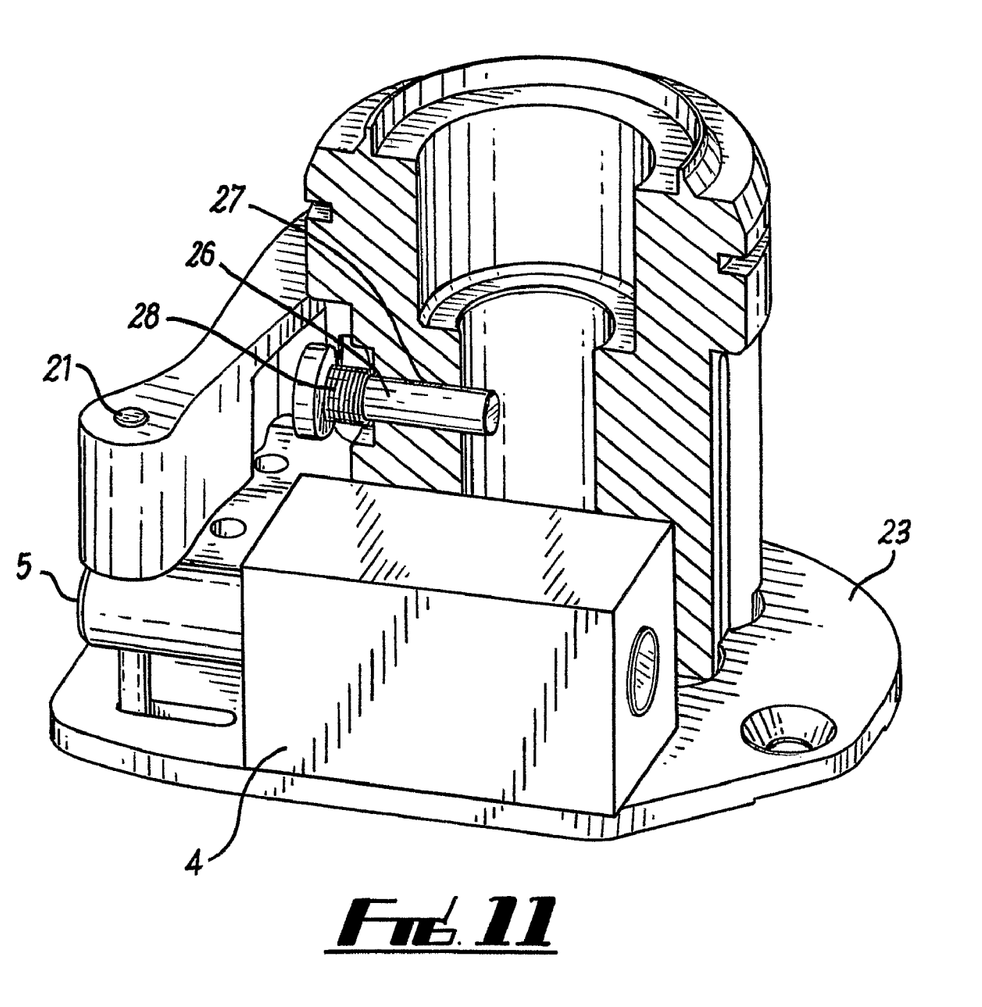

FIG. 1(1) shows a back view of the mechanism. The associated vehicle engine is off, there is no ignition key in the lock, a microswitch which senses the presence of a key is therefore off and the solenoid adopts an unblocking position, that is a position which permits turning of a key inserted in the lock.

Figure 12:
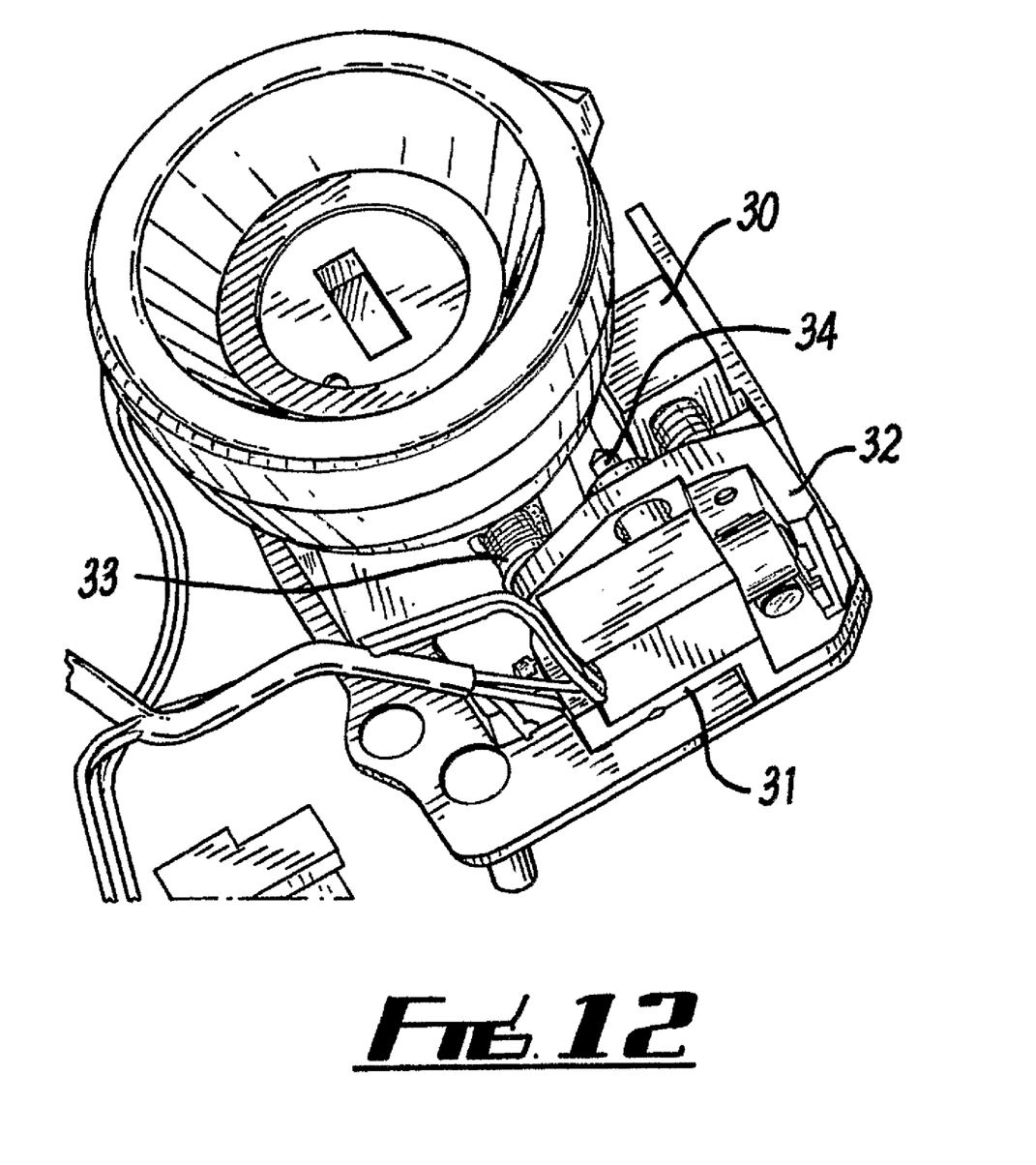

FIG. 1(2) shows a front view of the lock. Again the engine is off, but the ignition key is inserted in the lock. The microswitch senses the presence of the key and is on, and the solenoid still adopts an unblocking position in relation to the lock.

Figure 13:
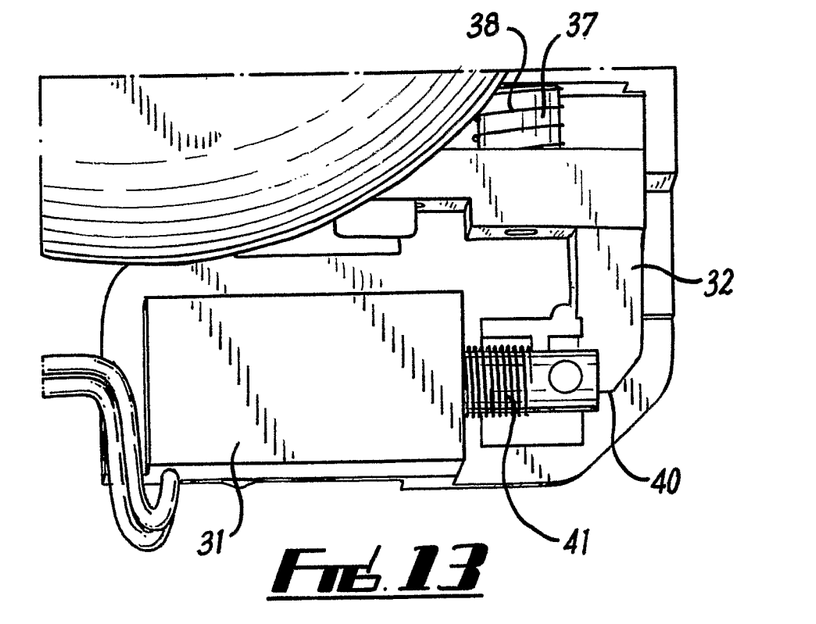

FIG. 1(3) again shows a front view of the lock and again the engine is off. The barrel 1 has been rotated through 60° switching on the ignition prior to starting the vehicle engine, the microswitch senses the presence of the key and is on and the solenoid 4 adopts an unblocking position in relation to the lock.

Figure 14:
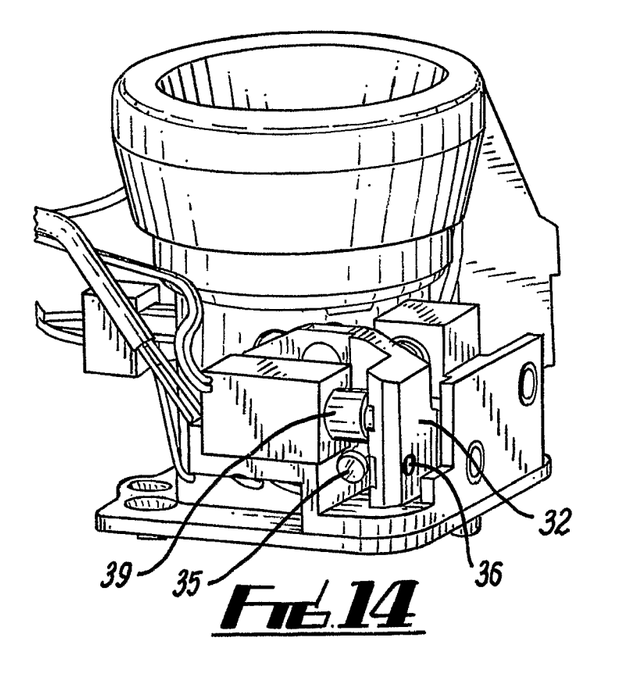

FIG. 1(4) shows a front view in the motoring position, the vehicle engine having been started and running. The barrel 1 has been rotated through 90°, the microswitch is on and the solenoid adopts an unblocking position in relation to the lock.

FIG. 1(5) shows a front view in the engine on condition with the barrel 1 turned back to the 60° position, the microswitch on and the solenoid adopting an unblocking position in relation to the lock.

FIG. 1(6) shows a front view in the shut down engine condition. The barrel 1 is returned to the 0° position, the microswitch is on and the solenoid adopts an unblocking position.

In all the above conditions of the lock mechanism the gear shifter of the automatic gearbox of the vehicle is in the park position. When the key barrel is also in the 0° (off) position as shown in FIGS. 1(1) to 1(5), the key may be removed.

Referring to FIGS. 2(1) to 2(4), various conditions of the lock mechanism are shown with the gear shifter of the vehicle automatic gearbox not in the park position.

FIGS. 2(1) to 2(3) show the mechanism in front view and FIG. 2(4) in back view.

Figure 1:
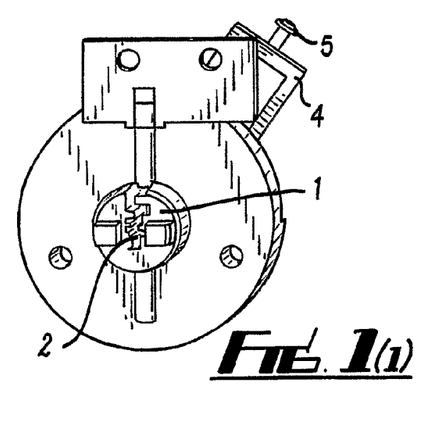
Figure 2:
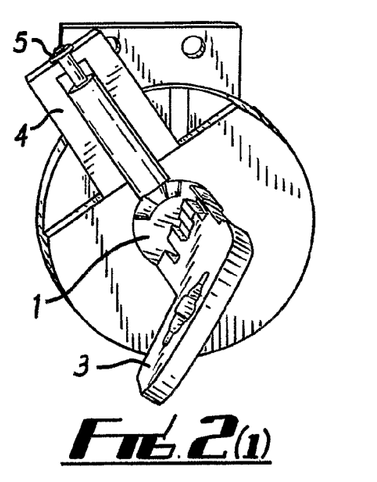
Figure 3:
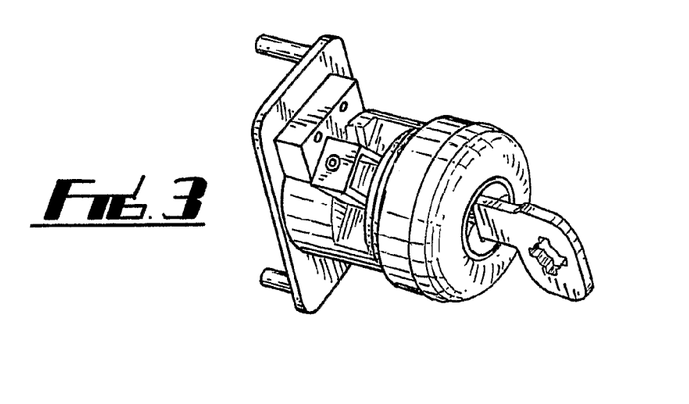
FIG. 3 shows a front perspective view of the mechanism of FIGS. 1 and 2.

FIG. 3 shows a front perspective view of the lock mechanism.

In these figures parts of the mechanism bear the same reference numerals as the same parts in FIGS. 1(1) to 1(6). FIG. 2(1) shows a shutdown engine condition. The key is present and the microswitch therefore on. The lock barrel 1 is rotated to 30° position which is the normal accessories position maintaining the supply to, for example, the vehicle radio. The gear shifter of the automatic gearbox is in drive and the solenoid adopts a blocking position preventing rotation of the key to the off position. The gear selector can be in drive, and the key in accessories. But, as explained above, for this to have happened, the key must have first been taken to ignition, the gear selector moved to drive, and then the key returned to accessories. The key therefore cannot be removed from the lock. The position if the engine is to be started is shown in FIG. 2(3). The barrel 1 may be rotated to the 60° engine on position but is otherwise blocked. The microswitch senses the presence of the key and is therefore on. With reference to FIGS. 2(3) and 2(4), if it is desired to remove the key, the barrel 1 is blocked in by the solenoid until 30° before the off position.

The microswitch senses the presence of the key and is therefore on. If the key is to be removed the gear shifter must be moved to the park position. The solenoid then adopts an unblocking position allowing the key to be turned the final 30° to the off position in which the key may be removed.

Figure 4:
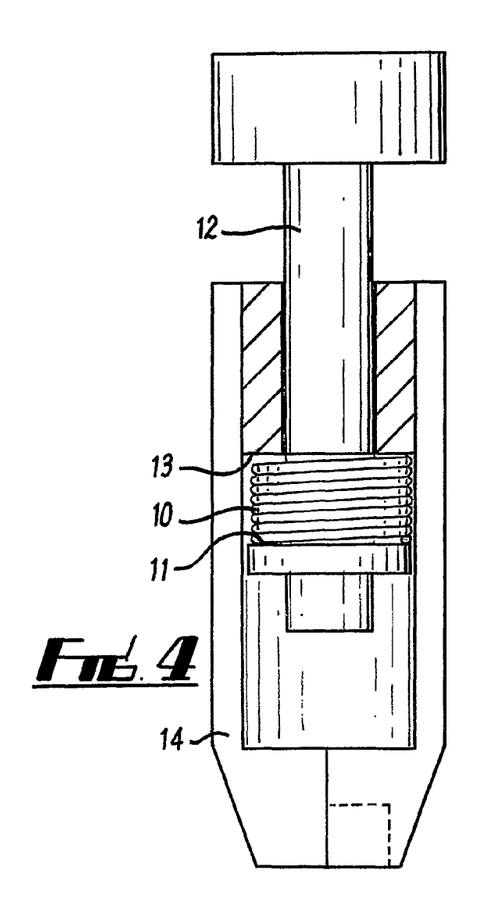
FIGS. 4 to 6 show a modification of a solenoid forming part of the mechanism of FIGS. 1, 2 and 3.
Figure 5:
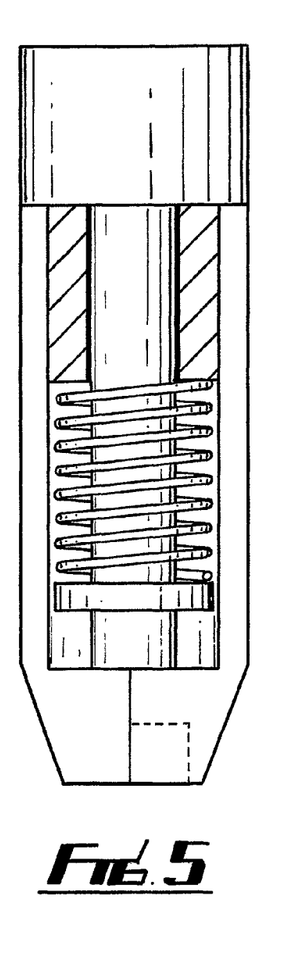
Figure 6:
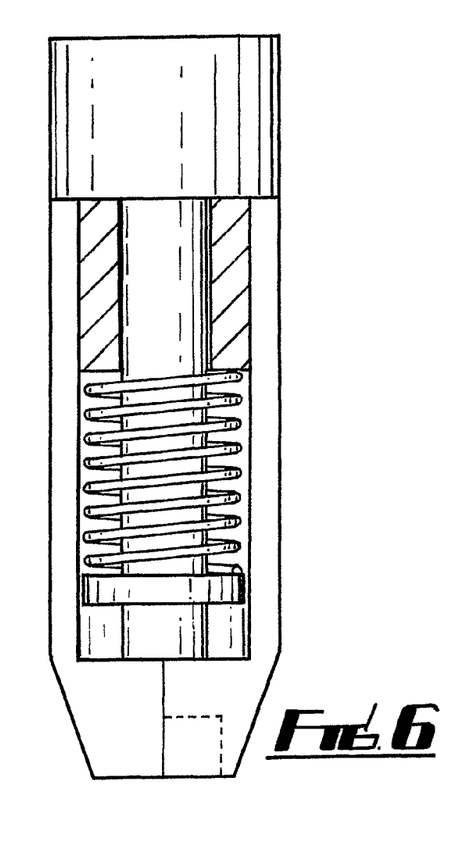
Figure 7:
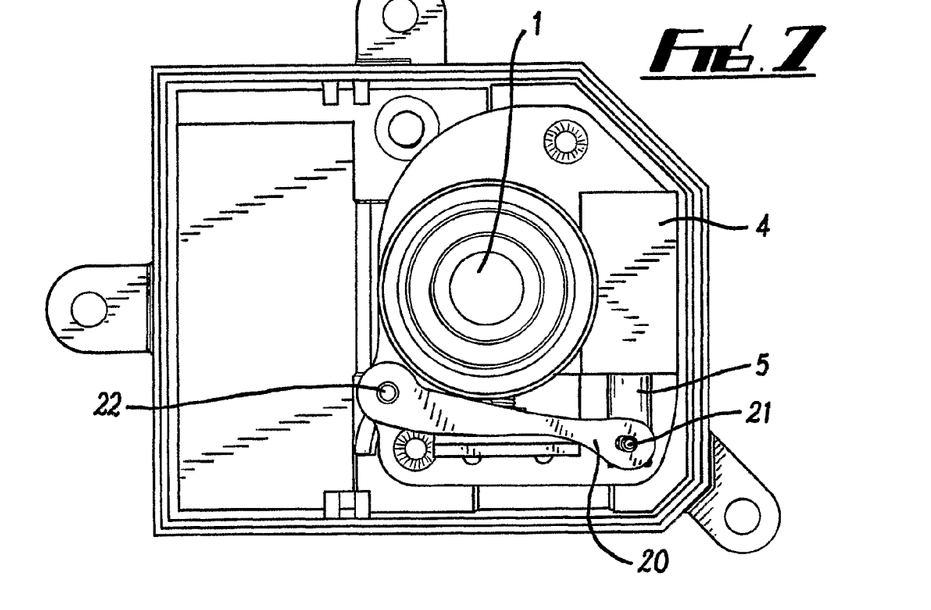
FIG. 7 is a diagrammatic plan view of a second embodiment of the invention.

FIGS. 4 to 6 shows a modification of the bistable solenoid of the mechanism described above. This modification is intended to avoid a potential malfunction in the event that the vehicle driver tries to turn the key to the off position and move the gear shifter into the park position simultaneously. In that event the solenoid and in particular the solenoid armature may not move to an unblocking position because it is held in the blocking position in the barrel 1 by friction. For this purpose a helical compression spring 10 is constrained to act between an abutment 11 on the armature 12 and an abutment 13 on a pin 14 at the operative end of the armature. When the solenoid is activated to move the armature 12 to an unblocking position the pin 13 should be released from the barrel 1 but may be jammed by the driver action of pushing simultaneously turning the key to off and the gear shifter to park. The spring 10 is therefore compressed but the pin immediately conforms under pressure from this compressed spring as soon as the key is relocated.

This unblocking position of the armature 2 with the spring 10 released is shown in FIG. 5. The "normal" blocking position of the armature is shown in FIG. 6.

A second embodiment is illustrated in FIGS. 7 to 11. In this second embodiment, a bi-stable solenoid and key release mechanism are incorporated as before but the spatial arrangement of the solenoid 4 and the lock differs. In this second embodiment parts equivalent to the parts of the first embodiment bear the same reference numerals. The solenoid 4 is disposed laterally to one side of the lock. The armature 5 of the solenoid 4 is pivotally connected at its free end to a lever 20 via a pin 21. The lever 20 is pivotally connected at its other end via a pin 22 to a metal plate 23 on which the barrel 1 and solenoid 4 are also mounted. A helical spring 29 is disposed around the pin 22 and acts to urge the lever 22 towards the lock. A guide pin 24 extends from the armature 5 and runs in a pin guide slot 25 formed in the metal plate 23.

Figure 8:
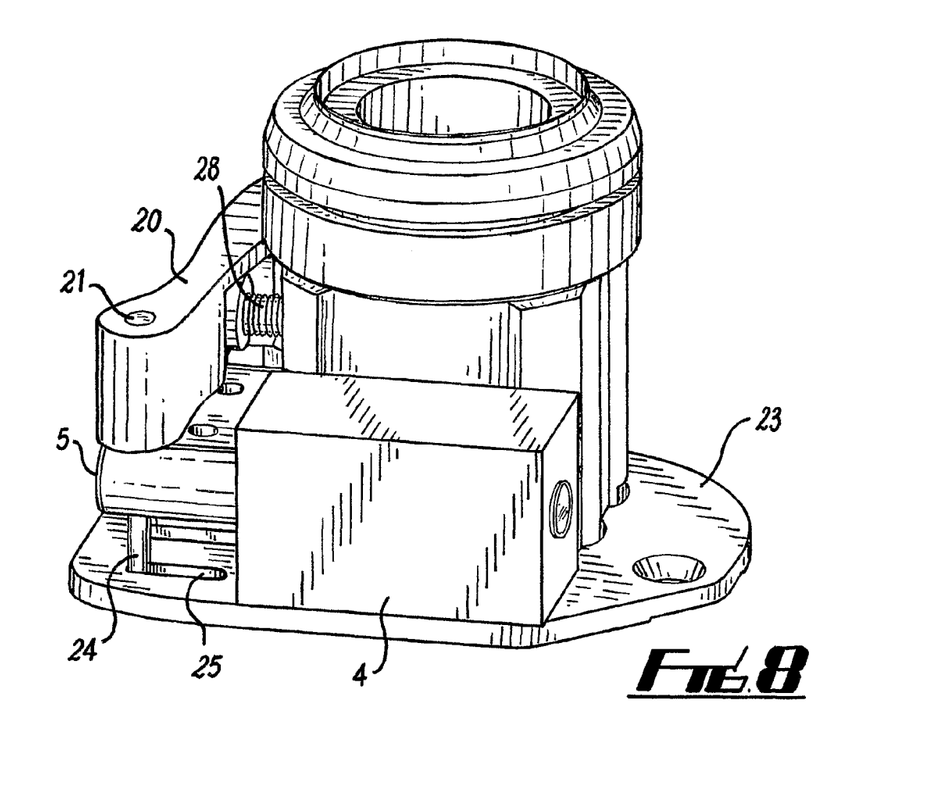
FIG. 8 is a side perspective view of the embodiment shown in FIG. 7, in an unlocked position.
Figure 9:
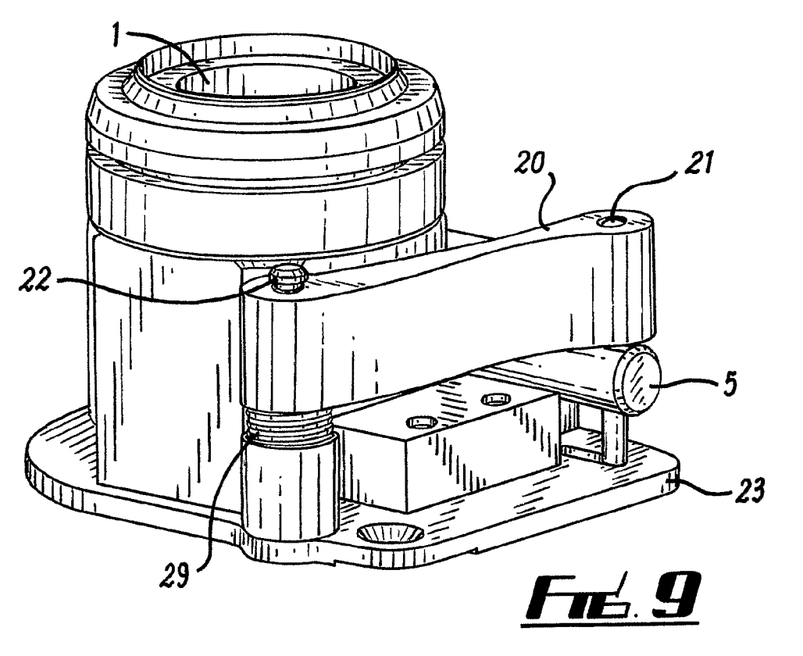
FIG. 9 is a front perspective view of the embodiment of FIG. 8.

A locking bolt 26 extends through an aperture 27 in the lock to the interior thereof. The bolt 26 is spring loaded by means of a compression spring 28, which acts to urge the bolt 26 outwardly with respect to the lock barrel 1. The locking bolt 26 contacts, but is not connected to the lever 20. In the unlocked position of the locking bolt 26, the armature 5 of the solenoid 4 is extended as shown in FIG. 8. This in turn pivots the lever 20 on its pin 22 allowing the locking bolt 26 to move outwardly under the action of the compression spring 28 into a position in which it does not lock the barrel 1 of the lock.

Figure 10:
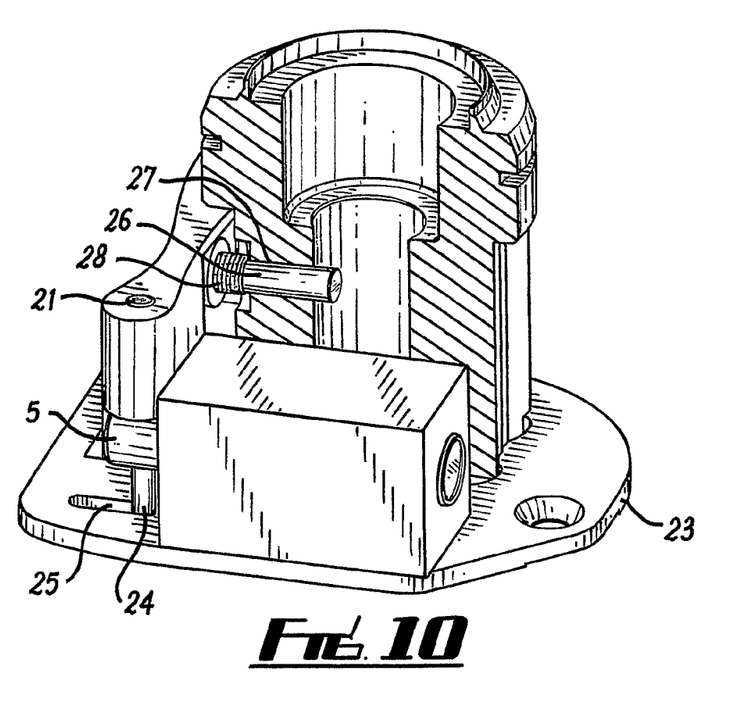
FIG. 10 shows the embodiment of FIGS. 7 to 9 in a locked position.

FIG. 10 shows the position with the barrel 1 of the lock in the locked position. In this position the armature 5 is in the pushed in position in the solenoid 4. The lever 20 is pivoted towards the lock about the pivot 22. This in turn urges the locking bolt 26 against the action of the compression spring 28 into locking engagement with the barrel 1 of the lock.

FIG. 11 shows the position, already described in relation to the first embodiment, in which the locking bolt 26 is jammed in the locked position, even though the solenoid is unblocking, by the operation of the ignition key and with the gear selector in park. As can be seen the solenoid armature 5, and the lever 20 adopt the same positions as in the solenoid unlocked position shown in FIG. 8. However, as the locking bolt 26 is jammed it remains pressed against the lock barrel 1 and spaced away from the lever 20. As soon as the key is released, the bolt is unjammed and urged away from the barrel 1 under the action of the compression spring 28 until it abuts the lever 20.

Referring to FIGS. 12 and 13, the further embodiment according to the invention comprises two solenoids respectively referenced 30 and 31 and disposed with their operating axes at right angles or substantially at right angles to each other. Solenoid 30 is a locking solenoid and solenoid 31 an unlocking solenoid. A slider 32 is disposed between the two solenoids. This slider 32 coacts with a spring loaded locking pin 33 and around a locking damper 34. The shaft 35 of the locking solenoid is connected to the slider 32 by means of a pin 36 which extends into both the shaft 35 and the slider 32. The slider 32 is disposed for slidable movement on a guide pin 37. A compression spring 38 coaxially surrounds the guide pin 37. The shaft 39 of the unlocking solenoid 31 extends towards the slider 32 and is operative, in a manner to be described later, to coact with the notch 40 formed on the slider 32. The shaft 39 is also spring loaded by means of a compression spring 41 coaxially surrounding the shaft 39. An unlocking damper is associated with the shaft 39.

The operation of the above described arrangement is as follows. To move from an unlocked position to a locked position in which the key locking pin 33 locks the ignition key in the accessories position (and therefore prevents its removal) the locking solenoid 30 is operated electromagnetically pulling the shaft 35 of the solenoid 30 inside the armature of the solenoid. This also pulls the slider 32 which is linked to the shaft 35 by pin 36 inwards towards the solenoid against the action of the spring 38. The slider 32 slides on the guide pin 37 preventing any tendency of the slider to rotate. This movement brings the notch 40 on the slider 32 into line with the shaft 39 of the unlocking solenoid 31. The spring 41 then pushes the shaft 39 of the unlocking solenoid 31 mechanically into the notch 40 locking the slider 32 and the locking pin 33 in the locked position. The ignition key is also locked in position as the key is in the accessories position and cannot be rotated to the off position and removed, this rotation being prevented by the locking pin 33.

To move from the locked position to the unlocked position, the unlocking solenoid 31 is activated. The shaft 39 of solenoid 31 is pulled inside the armature of the solenoid against the action of spring 41 and out of the notch 40 in the slider 32 thereby releasing slider 32. This in turn enables the slider 32 to be pushed away from solenoid 30 under the action of spring 38 around guide pin 37. The spring loaded key locking pin 33 is pushed outwardly by means of its spring thus releasing the lock and enabling the ignition key to be rotated to the off position where it can be removed. The locking damper 34 and unlocking damper are both made of a sound deadening material and respectively absorbs the sound and slows the speed of the mechanism when the locking and unlocking solenoids are activated.

In a modification of the embodiment of FIGS. 12 to 14, the slider 32 is replaced by a lever which pivots itself and a locking pin between locking and unlocking positions in relation to the ignition key mechanism. In other respects the arrangement is the same as the FIG. 12 to 14 embodiments. The arrangement of FIGS. 12 to 14 and its modification is smooth, quiet and reliable in operation. This slider embodiment is a combination of the embodiment in FIG. 12 to 14, and embodiment in FIG. 7 to 10 (which shows how a slider can be assembled against the switch)

It will be appreciated that the above embodiments have been described by way of example only and that many variations are possible within the scope of the claims.

The invention claimed is:

1. An ignition key switch mechanism for a vehicle comprising a lock barrel connected to an ignition switch, the lock barrel defining an ignition key aperture for an ignition key and having an off position means preventing removal of an inserted key from the lock barrel in any position of the barrel other than the off position and means preventing turning of the barrel to the off position unless the gear shifter of an associated gearbox is in a park position, wherein the means for preventing turning of the barrel comprises first and second solenoids and an intermediate member disposed between the solenoids, the first solenoid being operable to move the intermediate member between a first position in which turning of the ignition key in the ignition key aperture to the off position is permitted and a second position in which turning of the ignition key in the ignition key aperture is prevented to correspondingly permit or prevent removal of the ignition key from the ignition key aperture and the second solenoid being arranged to lock the intermediate member in the second position and operable to release the intermediate member from the second position.

2. An ignition key switch mechanism for a vehicle as claimed in claim 1, in which the intermediate member comprises a slider.

3. An ignition key switch mechanism for a vehicle, comprising a lock barrel connected to an ignition switch, the lock barrel defining an ignition key aperture for an ignition key, and having an off position means preventing removal of an inserted key from the lock barrel in any position of the barrel other than the off position and means preventing turning of the barrel to the off position unless the gear shifter of the associated gearbox is in a park position, and solenoid means comprising first and second solenoids, and an intermediate member disposed between the solenoids, the intermediate member being disposed for movement between a first position in which turning of the ignition key in the ignition key aperture is prevented and a second position in which turning of the ignition key in the ignition key aperture to the off position is permitted to correspondingly prevent or permit removal of the ignition key from the ignition key, in which the intermediate member comprises a slider, and in which the slider is disposed for movement on a guide pin extending from the first solenoid.

4. An ignition key switch mechanism for a vehicle as claimed in claim 3, in which resilient means are provided on the guide pin to urge the slider away from the first solenoid.

5. An ignition key switch mechanism for a vehicle as claimed in claim 1, in which the first and second solenoids are arranged with their axes of operation transverse to each other, and the intermediate member and second solenoid comprise means to lock the intermediate member and second solenoid relative to each other.

6. An ignition key switch mechanism for a vehicle, as claimed in claim 5, in which the means to lock the intermediate member and second solenoid comprise a notch on the member operative to lock with a shaft of the second solenoid.

7. An ignition key switch mechanism for a vehicle as claimed in claim 1, in which the intermediate member comprises a lever.

8. An ignition key switch mechanism for a vehicle, comprising a lock barrel connected to an ignition switch, the lock barrel defining an ignition key aperture for an ignition key, and having an off position means preventing removal of an inserted key from the lock barrel in any position of the barrel other than the off position and means preventing turning of the barrel to the off position unless the gear shifter of the associated gearbox is in a park position, and solenoid means comprising first and second solenoids, and an intermediate member disposed between the solenoids, the intermediate member being disposed for movement between a first position in which turning of the ignition key in the ignition key aperture is prevented and a second position in which turning of the ignition key in the ignition key aperture to the off position is permitted to correspondingly prevent or permit removal of the ignition key from the ignition key, and in which dampers are disposed between the intermediate member and the lock barrel and between the intermediate member and the second solenoid.

9. An ignition key switch mechanism for a vehicle as claimed in claim 1, in which a locking pin is associated with the intermediate member and is adapted to prevent turning of the ignition key and to permit said turning in the first and second positions respectively of the intermediate member.

10. A control system for a vehicle having a gear shifter controlled automatic gearbox and an ignition key switch mechanism as claimed in claim 1.

11. A vehicle having a control system as claimed in claim 10.

\* \* \* \* \*